United States Patent
Yim et al.

(10) Patent No.: US 7,831,809 B2
(45) Date of Patent: Nov. 9, 2010

(54) METHOD FOR REDUCING CODE SIZE OF A PROGRAM IN CODE MEMORY BY DYNAMICALLY STORING AN INSTRUCTION INTO A MEMORY LOCATION FOLLOWING A GROUP OF INSTRUCTIONS INDICATED BY AN OFFSET OPERAND AND EITHER A LENGTH OPERAND OR A BITMASK OPERAND OF AN ECHO INSTRUCTION

(75) Inventors: Keun-soo Yim, Yongin-si (KR); Jae-don Lee, Paju-si (KR); Jeong-joon Yoo, Yongin-si (KR); Kyoung-ho Kang, Yongin-si (KR); Jung-keun Park, Seoul (KR); Chae-seok Im, Seoul (KR); Woon-gee Kim, Suwon-si (KR); Chang-woo Baek, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 216 days.

(21) Appl. No.: 11/510,730

(22) Filed: Aug. 28, 2006

(65) Prior Publication Data
US 2007/0074003 A1 Mar. 29, 2007

(30) Foreign Application Priority Data
Sep. 23, 2005 (KR) ...................... 10-2005-0088927

(51) Int. Cl.
G06F 9/40 (2006.01)
(52) U.S. Cl. ...................... 712/220; 712/233
(58) Field of Classification Search .................. 712/220
See application file for complete search history.

(56) References Cited

U.S. PATENT DOCUMENTS 5,117,498 A * 5/1992 Miller et al. ................. 712/241

(Continued)

FOREIGN PATENT DOCUMENTS

| JP | 7-28644 | 1/1995 |
|---|---|---|
| JP | 9-293003 | 11/1997 |
| JP | 2000-250753 | 9/2000 |
| KR | 10-2001-0021253 | 3/2001 |
| KR | 10-2004-0067063 | 7/2004 |
| KR | 10-2004-0080520 | 9/2004 |
| KR | 10-2005-0115875 | 12/2005 |
| KR | 10-2006-0010004 | 2/2006 |
| WO | 2004-075066 | 9/2004 |

OTHER PUBLICATIONS

Jeremy Lau et al. "Reducing code size with echo instructions"; Proceedings of the 2003 international conference on Compilers, architecture and synthesis for embedded systems; pp. 84-94 ; Year of Publication: 2003.*

(Continued)

*Primary Examiner*—Eddie P Chan
*Assistant Examiner*—Keith Vicary
(74) *Attorney, Agent, or Firm*—Staas & Halsey LLP

(57) ABSTRACT

A method of reducing a code size of a program by controlling a control flow of the program using software in a computer system is disclosed. The method includes the steps of storing a first program count of a first instruction in a first buffer when an error occurs while the first instruction having an Operand including Offset and Length is being executed among a plurality of instructions loaded in the code memory, changing a current program count of the code memory to a second program count which is obtained by adding the Offset to the first program count, storing a second instruction, which is located at a position shifted from the second program count by a value of the Length, in a second buffer, replacing the second instruction with a third instruction, which is not recognized by a microprocessor, replacing the third instruction with the second instruction stored in the second buffer when an error occurs while the third instruction is being executed, and changing the current program count of the code memory to a predetermined program count next to the first program count stored in the first buffer.

26 Claims, 9 Drawing Sheets

U.S. PATENT DOCUMENTS

| | | | |
|---|---|---|---|
| 5,632,028 A * | 5/1997 | Thusoo et al. | 703/26 |
| 5,940,850 A * | 8/1999 | Harish et al. | 711/102 |
| 6,240,500 B1 * | 5/2001 | Scales | 711/202 |
| 6,637,023 B1 * | 10/2003 | Ginsberg | 717/122 |
| 6,798,713 B1 * | 9/2004 | Yearsley et al. | 365/238.5 |
| 6,842,832 B1 | 1/2005 | Franaszek et al. | |
| 7,222,258 B2 * | 5/2007 | Rothman et al. | 714/6 |
| 2003/0229709 A1 * | 12/2003 | Fraser | 709/231 |
| 2004/0199754 A1 * | 10/2004 | Vasekin | 712/242 |
| 2005/0228960 A1 * | 10/2005 | Francis et al. | 711/165 |
| 2005/0257037 A1 * | 11/2005 | Elwood et al. | 712/242 |
| 2005/0278508 A1 * | 12/2005 | Vasekin et al. | 712/210 |
| 2006/0174163 A1 * | 8/2006 | Gravoille et al. | 714/38 |
| 2006/0206886 A1 * | 9/2006 | Wu et al. | 717/151 |
| 2007/0011431 A1 * | 1/2007 | Hogdal et al. | 711/207 |
| 2009/0313611 A1 * | 12/2009 | Panchamukhi et al. | 717/129 |

OTHER PUBLICATIONS

Keun Soo Yim Jeong-Joon Yoo Jae Don Lee Jihong Kim; "Operating System Support for Procedural Abstraction in Embedded Systems", Embedded and Real-Time Computing Systems and Applications, 2006. Proceedings. 12th IEEE International Conference on; Year of Publication: 2006.*

Kampe, "Processes: the system view"; http://www.cs.ucla.edu/classes/spring03/cs111/I2/slides/process_s.pdf; Dated Mar. 5, 2003.*

Jones, Douglas W. "What is a System Call"; Archived on Oct. 11, 2007 at http://web.archive.org/web/20071011200113/http://www.cs.uiowa.edu/~jones/security/notes/08.shtml; however, see the rejection regarding how it is used.*

Youfeng Wu et al. "Enhanced code density of embedded CISC processors with echo technology"; International Conference on Hardware Software Codesign; Proceedings of the 3rd IEEE/ACM/IFIP international conference on Hardware/software codesign and system synthesis; pp. 160-165 ; Year of Publication: 2005.*

Brisk P, Nehapetian A, Sarrafzadej M. Instruction selection for compilers that target architectures with echo instructions. Proceedings of the 8th International Workshop on Software and Compilers for Embedded Systems (SCOPES), Sep. 2004.*

Notice Of Allowance issued in corresponding Korean Patent Application No. 10-2005-0088927.

* cited by examiner

US 7,831,809 B2

METHOD FOR REDUCING CODE SIZE OF A PROGRAM IN CODE MEMORY BY DYNAMICALLY STORING AN INSTRUCTION INTO A MEMORY LOCATION FOLLOWING A GROUP OF INSTRUCTIONS INDICATED BY AN OFFSET OPERAND AND EITHER A LENGTH OPERAND OR A BITMASK OPERAND OF AN ECHO INSTRUCTION

CROSS-REFERENCE TO RELATED APPLICATIONS

This application claims the benefit of Korean Patent Application No. 10-2005-0088927 filed on Sep. 23, 2005 in the Korean Intellectual Property Office, the disclosure of which is incorporated herein by reference in its entirety.

BACKGROUND OF THE INVENTION

1. Field of the Invention

The present invention relates generally to a computer system, and more particularly to a method of reducing code size of a program by controlling the control flow of the program using software in a computer system including a microprocessor and a memory.

2. Description of the Related Art

Portable devices or small-sized electronic appliances used in the office or at home, such as refrigerators, cleaners, printers or flash memory cards, are equipped with middleware that cooperates with a real time operating system in order to control devices installed in the electronic appliances, such as motors, in real time. Since electronic appliances are mass-produced in a range of several millions to several billions per year, it is very important to reduce the manufacturing cost of the electronic appliances. A computer system that is installed in the electronic appliance in order to control the operation of the electronic appliance in real time may include a processor, a memory and a peripheral input/output device. Among the above components of the computer system, the memory, such as SRAM or DRAM, generally requires a relatively higher manufacturing cost. Therefore, it is necessary to reduce the size of a program in order to reduce the manufacturing cost of the memory.

If the size of the program is reduced, the manufacturing cost of the memory will also be reduced. This kind of gain may be realized when fabricating memory chips, which are provided with a predetermined size corresponding to a multiple of 2, such as 256 KB, 1 MB, and 2 MB. For instance, when it is necessary to use a 2 MB memory chip for a program having a size of 1.2 MB, if it is possible to reduce the size of the program to a size less than or equal to 1 MB, a system can be established by using a 1 MB memory chip. If the size of the memory chip is reduced, the amount of power required for driving the memory can be reduced. In addition, if the size of the program is reduced, it is possible to operate the memory at a lower power even if the size of the memory chip is not reduced, so that power consumption can be reduced. Such a characteristic of the low-power operation is especially advantageous when it is applied to mobile electronic appliances.

In this regard, various conventional technologies have been suggested in order to minimize the size of various code. For example, a compression technique has been suggested, which formats the program such that direct execution of the program is impossible, and a compaction technique, which formats the program in the form of an executable program. The compression technique is classified into a hardware compression technique using a hardware compressor and a hardware restorer, and a software compression technique in which compression and restoration are executed through software via a CPU.

The hardware compression technique can be implemented through various schemes. For instance, according to the hardware compression technique, data is compressed and stored in a main memory based on a line unit of an internal cache, and then the compressed data are released by a hardware restorer when a corresponding compression cache line is accessed, thereby storing the released data in the internal cache. However, although the hardware compression technique can reduce the time required for data restoration, the manufacturing cost may be increased because it requires the hardware restorer, so the hardware compression technique may not be suitable for a computer system, which is installed in the electronic appliance in order to control the operation of the electronic appliance in real time.

According to the software compression technique, the main memory is divided into a compression area and a non-compression area, and these areas are managed by the operating system. In detail, a memory manager of the operating system directly restores data, and stores the restored data in the non-compression area if the data requires a specific address or the data has a higher probability of use. At this time, if the size of the non-compression area is insufficient, some data stored in the non-compression area with a lower probability of use is compressed and then stored in the compression area. However, although the software compression technique does not require additional hardware, such as a compressor, a relatively long time is necessary to compress and restore the data because the software compression technique is slower than the hardware compressor. In addition, the existing operating system must be modified. Therefore, both the software compression technique and the hardware compression technique may not be suitable for the computer system embedded in the electronic appliance.

Compaction techniques can be classified into ISA (instruction set architecture) modification schemes, and a program modification schemes for modifying a program by using instructions. According to the ISA modification scheme, instruction sets having different sizes, such as THUMB® (16 bits) and ARM (32 bits) and MIPS 16 (16 bits) and MIPS14 (14 bits), are defined so as to use the instruction sets according to applications. However, the ISA modification scheme requires a mass-storage processor, such as ARM or MIPS, and such a mass-storage processor is not suitable for some applications. The acronym "ARM" refers to "advanced RISC machine," where the acronym "RISC" refers to "reduced instruction set computing." The acronym "MIPS" refers to "microprocessor without interlocked pipeline stages."

In addition, according to the program modification scheme, which has been variously studied in the past five years, the same or similar instructions in the program are combined into one instruction set, and a branch to newly constructed areas is performed at all locations where the instruction set exists. In detail, the program modification scheme is based on procedural abstraction (PA) and cross jumping (CJ)/tail merging. According to PA, if there are N instructions, which are similar or identical to each other, they are decomposed into one function, and a function call instruction is substituted for the N instructions. In particular, in CJ, if the last instruction of the instructions branches to the same location, the instructions are shifted into the start position of the branch point.

In a case of an actual program, the order of the instructions may be changed or the register name may be partially incorrect. In this case, instruction reordering and register renaming schemes are utilized in order to replace similar instructions with the same instructions. According to the test result, if the above schemes are applied at compile time, the code size can be reduced by 5% on average compared to its original size. In addition, if the above schemes are applied to a binary file after linking, the code size can be reduced by 30% on average compared to its original size. Since the binary file has all information related to the control flow of the program, the code size can be effectively optimized.

Since the iterative instructions are decomposed into the function, the program modification scheme must use additional instructions in order to call and execute the function. In detail, a current return address must be stored in a stack when calling the function, and registers of the called function must be protected in the stack. In addition, the control flow of the program must return to the original stage after the function has been executed. For this reason, an instruction "Sequential Echo <offset>,<length>" has been suggested in order to reduce the use of the additional instructions.

The instruction "Sequential Echo <offset>,<length>" refers to executing a predetermined number (<length>) of instructions from the <offset> position. If this instruction is used, the control flow of the program can return to the original stage after executing corresponding instructions. This can be implemented by modifying the ISA of the processor, the interpreter or the virtual machine, such as the Java Virtual Machine. In addition, an instruction "Bitmask Echo <offset>, <bitmask>" refers to executing the instructions from the <offset> position only when bits corresponding to the instructions are set to "1" in the "bitmask" of the instructions. Therefore, even if there are some different instructions among all the instructions, they may share the code of the program so that the size of the program can be significantly reduced. According to the performance evaluation result, when the above scheme is utilized together with the conventional code optimization technique, the code size can be halved as compared with the conventional code compression technique.

Although the size of the program can be reduced using the Echo instructions, it is necessary to modify the ISA of the microprocessor, in practice. This may require a change of hardware, causing an increase in the development cost of the microcomputer system equipped in the electronic appliance. Accordingly, it is necessary to develop a method of supporting the instructions "Sequential Echo" and "Bitmask Echo" without changing the hardware.

SUMMARY OF THE INVENTION

Additional aspects, features, and/or advantages of the invention will be set forth in part in the description which follows and, in part, will be apparent from the description, or may be learned by practice of the invention.

Accordingly, the present invention solves the above-mentioned problems occurring in the prior art, and the present invention provides a method, apparatus, and medium for reducing the code size of a program by controlling the control flow of the program using software in a computer system.

An aspect of the present invention provides a method of reducing a size of a program in a code memory, the method including storing a first memory address of a first instruction in a first buffer when a software interrupt occurs while the first instruction having two operands including Offset and Length is being executed from among a plurality of instructions loaded in the code memory; changing the program counter register value to a second memory address which is obtained by adding the Offset to the first memory address; storing a second instruction, which is located at a position shifted from the second memory address by a value of the Length, in a second buffer; replacing the second instruction with a third instruction, which triggers a software interrupt; replacing the third instruction with the second instruction stored in the second buffer when a software interrupt occurs while the third instruction is being executed; and changing the current program counter register value of the code memory to a predetermined memory address next to the first memory address stored in the first buffer.

According to another aspect of the present invention, there is provided a method of reducing a size of a program in a code memory, the method including executing a first instruction having two operands including Offset and Length and a second instruction ordering a branch to a system function, from among a plurality of instructions loaded in the code memory; storing a first memory address of the second instruction in a first buffer; changing the program counter register value to a second memory address which is obtained by adding the Offset to the first memory address; storing a third instruction, which is located at a position shifted from the second memory address by a value of the Length, in a second buffer; replacing the third instruction with a fourth instruction ordering a branch to the system function; replacing the fourth instruction with the third instruction stored in the second buffer when the fourth instruction has been executed; and changing the current program counter register value to a predetermined memory address next to the first memory address stored in the first buffer.

According to still another aspect of the present invention, there is provided a method of reducing a size of a program in a code memory, the method including copying instructions, which are located between a first position indicated by Offset and a second position shifted from the first position by a value of Length, in a temporary buffer when a software interrupt occurs while a first instruction having two operands including the Offset and Length is being executed from among a plurality of instructions loaded in the code memory; inserting a second instruction, which orders a return to an instruction next to the first instruction, into a location next to the instructions copied in the temporary buffer; executing the instructions copied in the temporary buffer; and returning to the instruction next to the first instruction loaded in the code memory according to execution of the second instruction.

According to still another aspect of the present invention, there is provided a method of reducing a size of a program in a code memory, including copying instructions, which are represented as iterative instructions, in a temporary buffer when a software interrupt occurs while a first instruction, among a plurality of instructions loaded in the code memory, is being executed; inserting a second instruction, which orders a return to an instruction next to the first instruction, into a location next to the instructions copied in the temporary buffer; executing the instructions copied in the temporary buffer; and returning to the instruction next to the first instruction loaded in the code memory according to execution of the second instruction.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
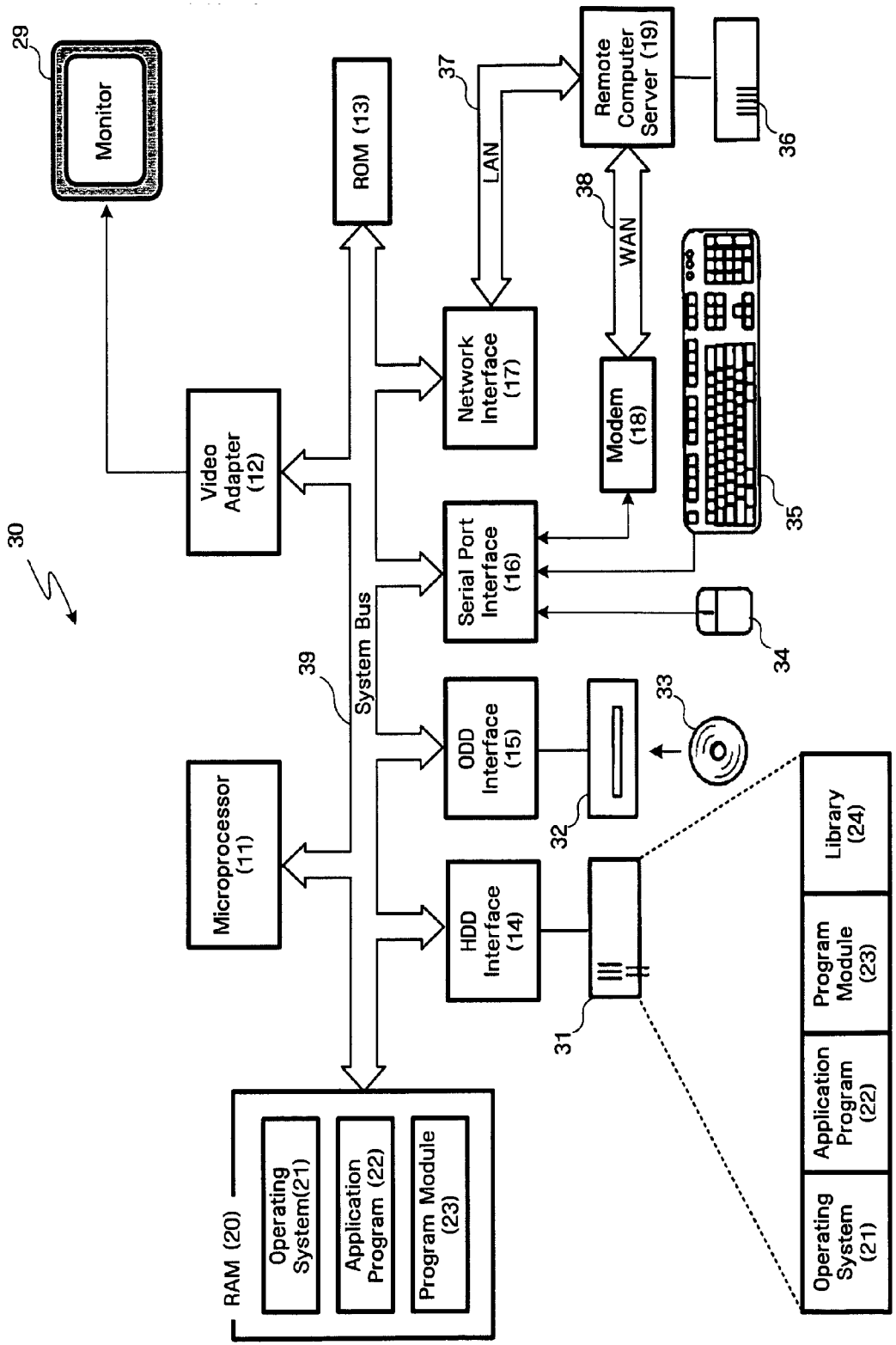
FIG. 1 is a view schematically showing a computer system used for implementing the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The matters defined in the detailed description such as the detailed construction and elements are provided to assist in a comprehensive understanding of the invention. Thus, it should be apparent that the present invention can be carried out without these details. In the following description of the present invention, the same drawing reference numerals are used for the same elements across in different drawings. Also, a detailed description of known functions and configurations incorporated herein will be omitted when it may make the subject matter of the present invention unclear.

Hereinafter, exemplary embodiment of the present invention will be described with reference to the accompanying drawings.

FIG. 1 schematically shows a computer system 30 used for realizing the present invention. The computer system 30 includes a microprocessor 11, a system bus 39, and a memory including a RAM 20 and a ROM 13 connected to the microprocessor 11 through the system bus 39. The RAM 20 and ROM 13 are examples. The memory may include other storage media. The computer system 30 can be used as a control system of a household electronic appliance and a mobile appliance, such as a mobile phone or a personal digital assistant (PDA).

In addition, a BIOS (basic input/output system) is stored in the ROM 13. The BIOS is a memory including a basic routine for transferring information, such as start-up, between components in the computer system 30. The computer system 30 also includes a hard disc drive (HDD) 31 and an optical disc drive (ODD) 32 for reading information from an optical disc 33 or reading/recording information from/to other optical media. The HDD 31 and the ODD 32 are connected to the system bus 39 through a hard disc interface 14 and an optical drive interface 15, respectively. The above drives and a computer-readable recording medium cooperating with the drives may provide a non-volatile storage medium in the computer system 30. Although the computer-readable recording medium is described with reference to the hard disc and the optical disc, those skilled in the art will appreciate that other computer-readable recording media, such as a magnetic cassette, a flash memory card, or a digital video disc (DVD), can also be used in the present invention.

A plurality of program modules including an operating system 21, at least one application program 22, a program module 23, and a library 24 can be stored in the HDD 31, the RAM 20, or the ROM 13.

A user can input commands and information to the computer system 30 using pointing devices, such as a keyboard 35 and a mouse 34. Other input devices, such as a microphone, a joystick, a game pad, and a scanner can also be used. The above input devices are generally connected to the microprocessor 11 through a serial port interface 16, which is connected to the system bus. However, it is also possible to connect the above input devices to the microprocessor 11 through other interfaces, such as a game port or a universal serial bus (USB). In addition, various display devices including a monitor 29 are connected to the system bus 39 through an interface including a video adapter 12. The computer system 30 may include other peripheral output devices (not shown), such as a speaker or a printer, in addition to the monitor 29.

The computer system 30 can be used in specific network environment employing logical connections with respect to at least one remote computer, such as a remote computer server 19. The remote computer server 19 may include a server, a router, a peer device or a common network node. Although the remote computer server 19 includes all or almost all of the above components that have been described in relation to the computer system 30, a memory storage unit 36 is shown only for illustrative purposes.

The logical connections include a local area network (LAN) 37 and a wide area network (WAN) 38. Such a network environment is typically adopted in an office, an enterprise-wide computer network, an Intranet, and the Internet.

When the computer system 30 is used in a LAN, it accesses the LAN 37 via the network interface 17. In addition, when the computer system 30 is used in a WAN, it generally includes a modem 18 or other units, which enable communication through the WAN 38, such as the Internet. The modem 18, which can be installed in the computer or connected to the computer system 30, is connected to the system bus 39 through the serial port interface 16. However, such network access is only illustrative, and other devices can be used to provide communication links between computers.

As described above, the computer system according to the present invention includes at least the microprocessor 11 and the memory. The microprocessor 11 has a branch instruction in order to hand over the execution authority for the instruction to the operating system 21 under the specific condition. The memory includes RAM 20, which can be written to, and ROM 13, which cannot be written to.

Under the above network environment, according to the present invention, the control of the microprocessor 11 branches to a specific location (for example, a location where the operating system is to be loaded from) in the memory 13 or 20 in order to execute a predetermined number of instructions, and then returns to the original stage while using only general instructions of the microprocessor 11 (Echo function). In addition, according to the present invention, the control of the microprocessor 11 branches to the specific location in the memory 13 or 20 so as to selectively execute instructions based on the Bitmask and then returns to the original stage (Bitmask Echo function). Therefore, it is possible to effectively reduce the size of the program without modifying existing hardware or providing separate hardware.

Figure 2:
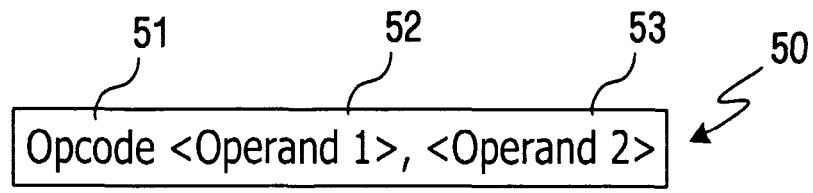
FIG. 2 is a view showing a format of an instruction executed in a memory by a microprocessor.

FIG. 2 shows a format of an instruction executed in the memory by the microprocessor 11. The instruction 50 includes an Opcode 51 representing the type of operating commands and at least one Operand 52 and 53. A register called a "PC" (program counter) is used in order to store a first byte corresponding to a location of the currently executed instruction 50 in the code memory. The code memory refers to an area allocated in the memory, such as the RAM 20 or the ROM 13, for allowing the microprocessor 11 to execute codes.

If the microprocessor 11 is given an "invoke" command while executing a predetermined Opcode, the microprocessor 11 stores the PC of the current frame in a system stack, and creates a new frame. Then, a start address of a method to be newly executed is set as a new PC value.

For instance, if there is an instruction "mov <ax>, <1234H>" in a predetermined location of the code memory, the microprocessor 11 reads the Opcode (mov) and the Operand (ax, 1234H) of the instruction and then stores a 16 bit value 1234H in a 16 bit register called "ax".

Figure 3:
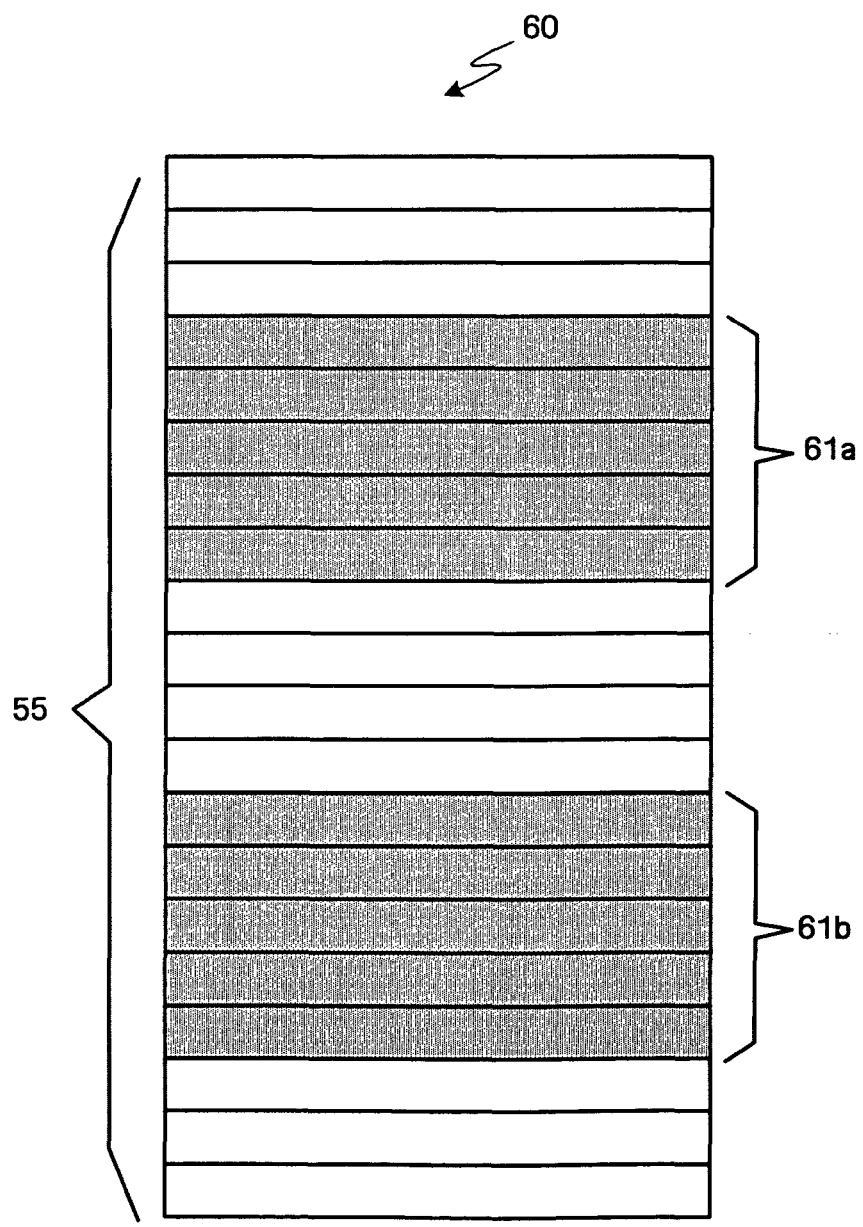
FIG. 3 is a view showing a structure of a code memory having iterative sections.

FIG. 3 is a view showing the structure of a code memory 60 having iterative sections. A plurality of instructions 55 are stacked in the code memory 60, and the microprocessor 11 sequentially executes the instructions 55 from the uppermost instruction to the lowermost instruction.

If instruction sets 61*a* and 61*b* marked with a shadow (shading) in FIG. 3 are identical to each other, memory is wasted by an amount corresponding to the size of the iterative instructions. Such an inefficient usage of the memory may become a serious problem in cases of household electronic appliances or portable devices having limited memory. According to the present invention, the iterative instruction sets 61*a* and 61*b* include at least one instruction.

Therefore, if the program consists of instructions having the structure as shown in FIG. 3, it is necessary to remove one of the iterative instruction sets 61*a* and 61*b* while allowing the microprocessor 11 to execute the same instructions. However, in order to allow the microprocessor 11 to directly recognize the instruction, such as the "Echo" instruction enabling the above function, hardware must be changed. The present invention provides six exemplary embodiments capable of achieving the above function using software.

Exemplary Embodiment 1

Figure 4:
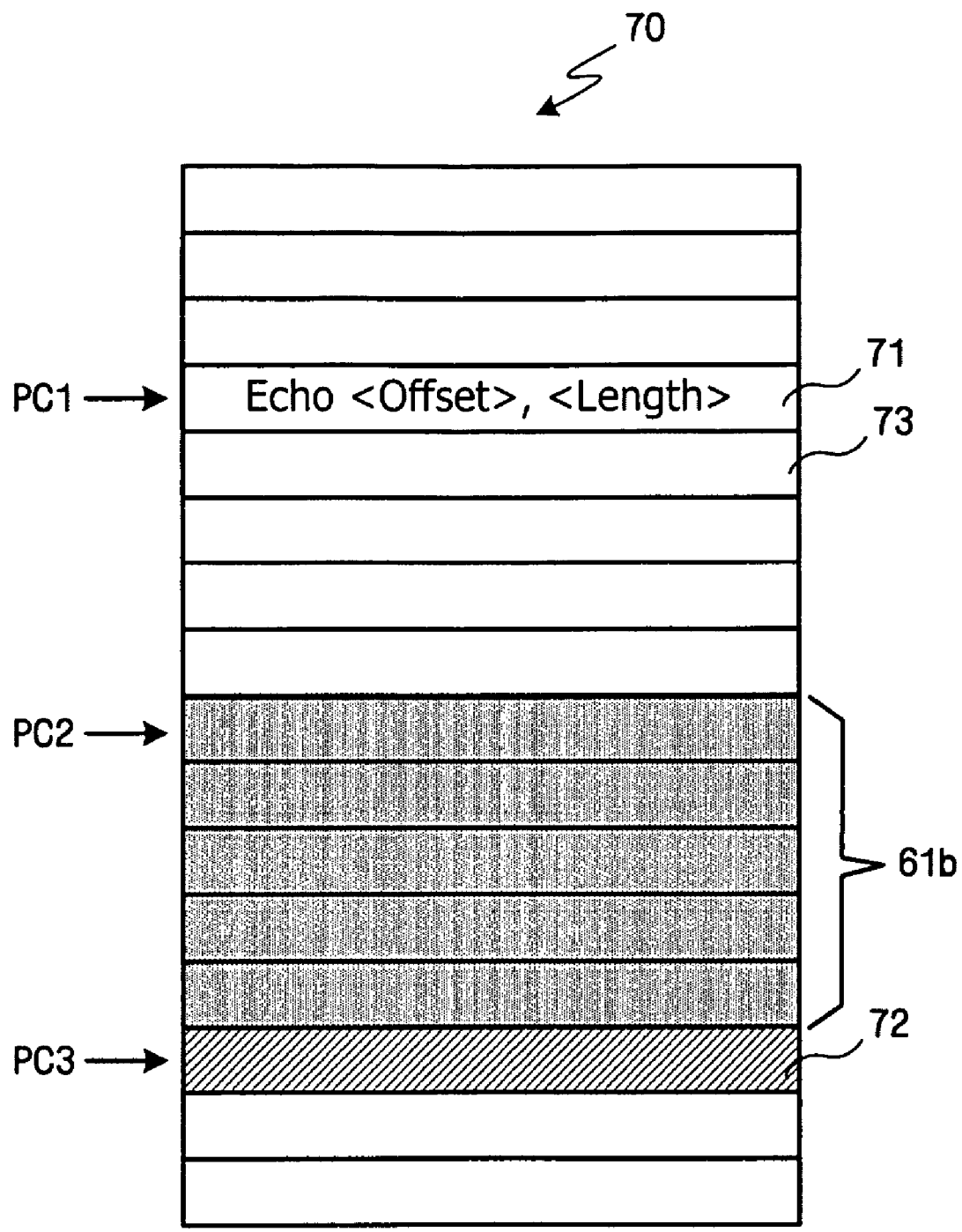
FIG. 4 is a view showing a structure of a code memory according to a first exemplary embodiment of the present invention.

FIG. 4 is a view showing a structure of a code memory 70 according to a first exemplary embodiment of the present invention. Different from the code memory 60 shown in FIG. 3, the code memory 70 shown in FIG. 4 has a compacted structure having no iterative instruction sets. In particular, the first instruction set 61*a* shown in FIG. 3 is removed and an "Echo" instruction 71 is added thereto. In addition, an original instruction located next to the second instruction set 61*b* is replaced with a predetermined instruction 72, and the predetermined instruction 72 is again replaced with the original instruction later.

The instruction 71 "Echo <Offset>, <Length>" is located at the fourth position of the code memory 70, that is, the first position of the instruction set 61*a* shown in FIG. 3. The microprocessor 11 cannot recognize the "Echo" instruction 71. For this reason, an error may occur when executing the "Echo" instruction 71 caused by an undefined instruction, so that an exception handling process is performed. Here, a current program count of the code memory 70 is PC1.

If the microprocessor 11 sends information about the instruction 71 causing the error to the operating system 21, the operating system 21 confirms that the Opcode of the instruction 71 is "Echo", thereby performing the exception handling process according to the present invention. At this time, the operating system 21 reads the current program count (PC1) of the instruction 71 and stores it in a predetermined first buffer. In addition, the operating system 21 determines that there is an instruction set 61*b* to be iteratively executed between a first position shifted from the PC1 by a value of <Offset> and a second position shifted from the first position by a value of <Length>.

Accordingly, the operating system 21 replaces an instruction located next to the instruction set 61*b* with a predetermined instruction 72, which is not recognized by the microprocessor 11. In addition, the operating system 21 stores an instruction, which is originally located in the position next to the instruction set 61*b*, in a predetermined second buffer. The first and second buffers may be specific memory areas or parts of the code memory 70. The predetermined instruction 72 may be the "Echo" instruction 71 or other instructions, which are not recognized by the microprocessor 11.

In addition, the operating system 21 increases the PC of the code memory 70 by a value of <Offset> from the PC1 (that is, PC2=PC1+Offset) and hands over the instruction execution authority to the microprocessor 11 in response to the return command.

Then, if the microprocessor 11 confirms that the current program count is PC2, the microprocessor 11 sequentially executes the instructions from the first instruction of the instruction set 61*b*. However, when the microprocessor 11 executes the instruction 72, which is not recognized by the microprocessor 11, the error may occur again.

In this case, the operating system 21 receives the instruction 72 from the microprocessor 11 in order to perform the exception handling. At this time, the current program count of the code memory 70 is PC3. Upon receiving the instruction 72 from the microprocessor 11, the operating system 21 determines that the instruction 72 is one added by the operating system 21, so the operating system 21 replaces the instruction 72 with the original instruction stored in the second buffer.

In addition, the operating system 21 changes the current PC of the code memory 70 to the PC, which is obtained by adding 1 unit to the PC1 stored in the first buffer. That is, the operating system 21 changes the current PC of the code memory 70 to the PC next to the PC1. The 1 unit refers to the difference of the PC between adjacent instructions of the code memory 70 and generally consists of 4 bits although it may vary depending on the type of the code memory 70. Then, the operating system 21 hands over the instruction execution authority to the microprocessor 11 in response to the return command.

Then, if the microprocessor 11 confirms that the current program count is (PC1+1 unit), the microprocessor 11 executes the corresponding instruction 73 and other instructions located below the instruction 73. As a result, the number of the instructions included in the code memory 70 can be reduced even though the execution procedure for the instructions is not changed from the execution procedure shown in FIG. 3.

Exemplary Embodiment 2

Figure 5:
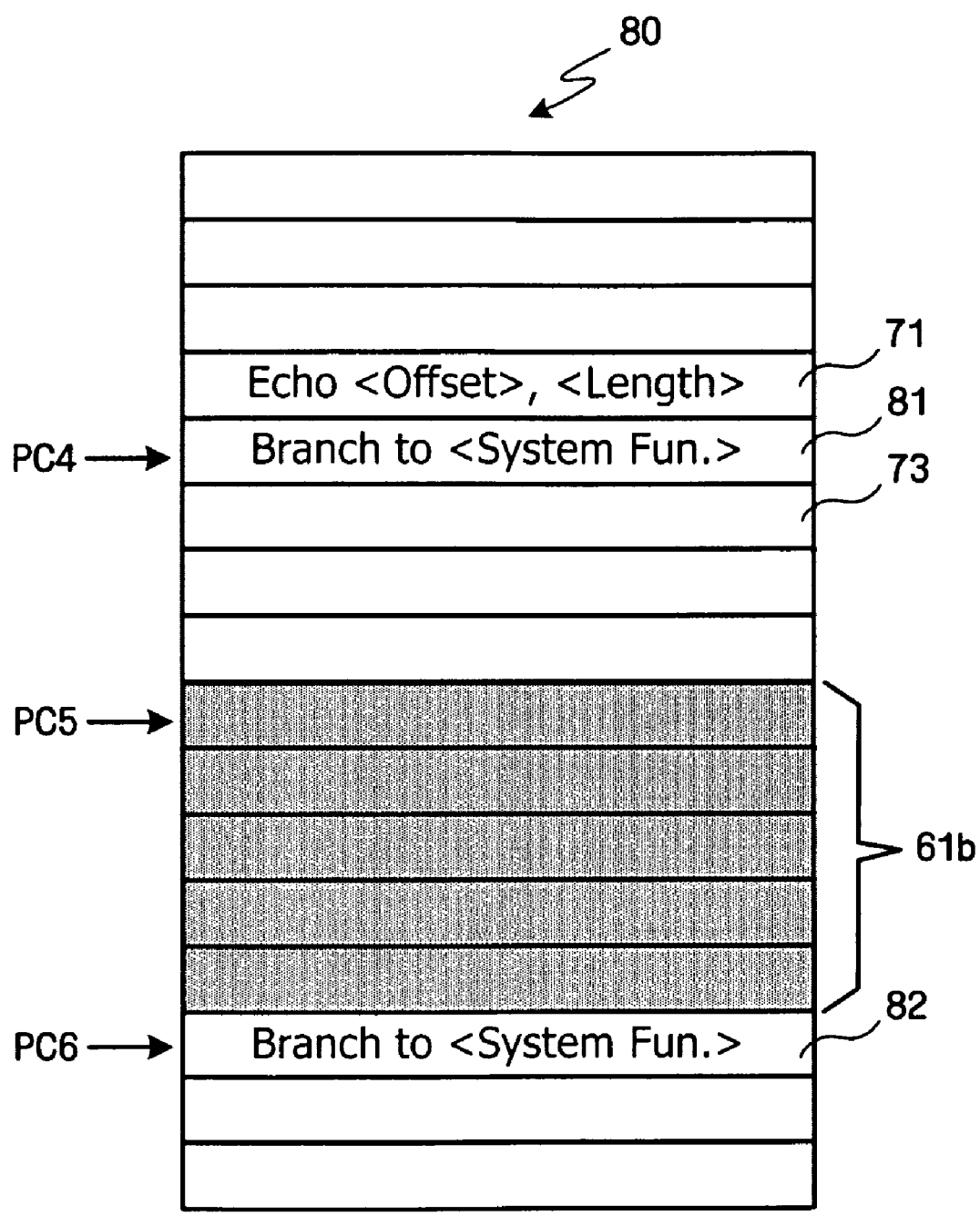
FIG. 5 is a view showing a structure of a code memory according to a second exemplary embodiment of the present invention.

FIG. 5 is a view showing a structure of a code memory 80 according to a second exemplary embodiment of the present invention. Different from the first exemplary embodiment of the present invention in which the additional cost may occur because several cycles are added to the control flow of the microprocessor 11 due to the exception handling process, the second exemplary embodiment of the present invention may not cause the additional cost by removing the exception handling process.

As shown in FIG. 5, although the error may occur when the microprocessor 11 executes the Echo instruction 71, the microprocessor 11 executes a "Branch" instruction 81 without performing the exception handling procedure. The "Branch" instruction 81 represents the branch to the first system function, which has been previously defined.

The first system function is defined in such a manner that the first system function can perform the procedure similar to the exception handling procedure executed by the operating system 21 in the first exemplary embodiment. In detail, the microprocessor 11 reads PC4 and stores it in the first buffer. Then, the microprocessor 11 increases the current PC of the code memory 80 by a value of <Offset> from the PC4 (that is, PC5=PC4+Offset) and stores an instruction located next to the instruction set 61b in a second buffer. At this time, the instruction located next to the instruction set 61b is replaced with the "Branch" instruction 82.

Then, after sequentially executing the instruction set 61b and the "Branch" instruction 82, the control of the microprocessor 11 branches to a second system function. The second system function changes the current PC (PC6) into the PC (PC4+1 unit) indicating an instruction 73 located next to the "Branch" instruction 81. At this time, the PC 4 can be obtained from the first buffer. In addition, the second system function replaces the "Branch" instruction 82 with the original instruction stored in the second buffer.

Thus, the microprocessor 11 sequentially executes the instruction 73 indicated by the PC (PC4+1 unit) and the instructions located downward from the instruction 73.

In this manner, if the "Branch" instructions and the system functions are employed, the exception handling process, which occur two times for one Echo command, can be removed. However, the first exemplary embodiment may be advantageous than the second exemplary embodiment in view of efficiency of the memory because the second exemplary embodiment further employs the "Branch" instruction 81.

Exemplary Embodiment 3

Figure 6:
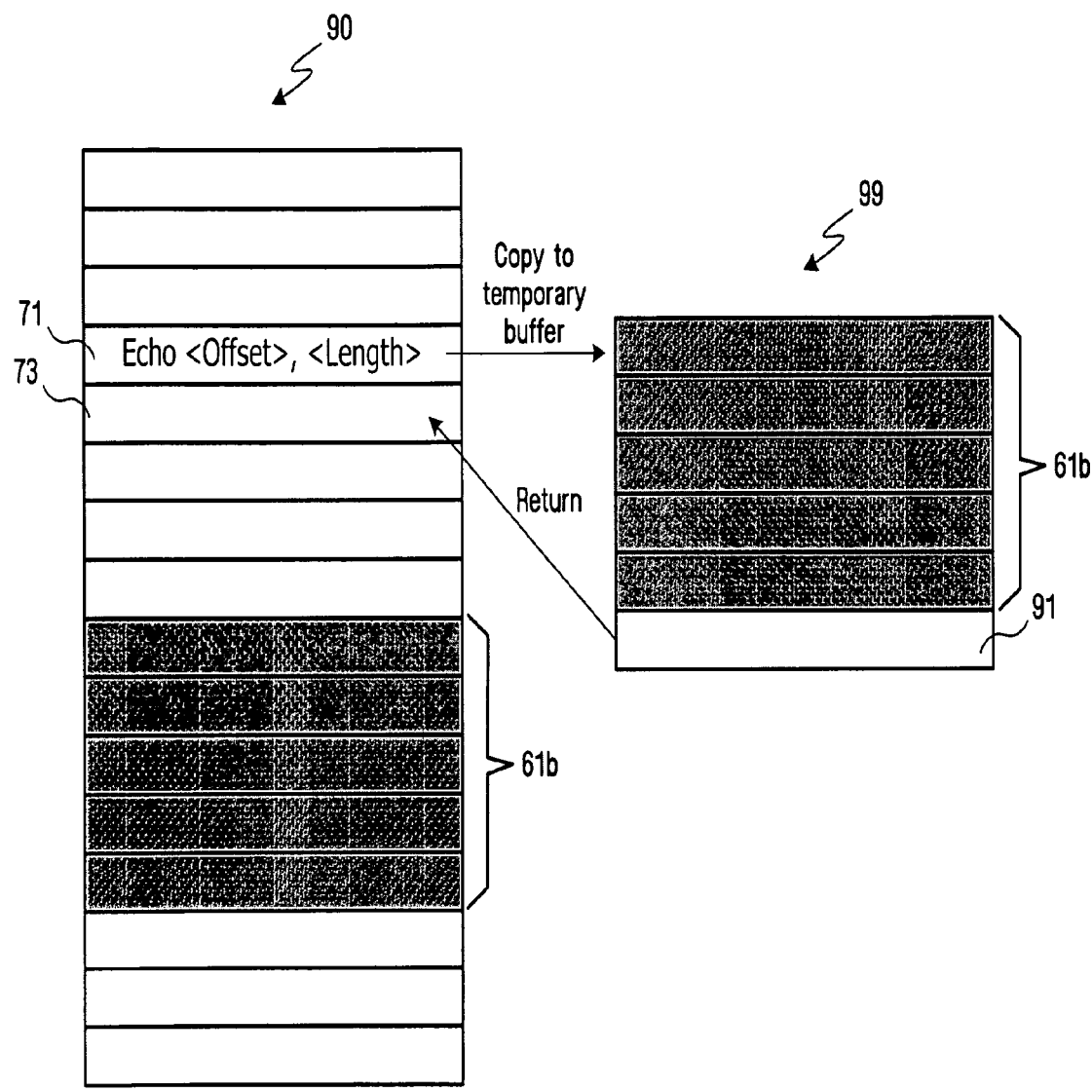
FIG. 6 is a view showing a structure of a code memory according to a third exemplary embodiment of the present invention.

FIG. 6 is a view showing a structure of a code memory 90 according to a third exemplary embodiment of the present invention. As shown in FIG. 6, the third exemplary embodiment of the present invention is partially modified from the first and second exemplary embodiments of the present invention. According to the third exemplary embodiment of the present invention, the branch instructions may not be modified by an exception handling unit of the operating system 21 or a system function, which has been previously defined. Instead, the instructions to be executed are stored in a temporary buffer 99 provided in the code memory 90 and then the instructions are executed after changing the addresses of the instructions corresponding to the positions of the instructions in the temporary buffer 99. The third exemplary embodiment of the present invention may be efficiently used when the original program includes a memory, such as the ROM 13, which cannot be corrected during execution.

If the microprocessor 11 meets the Echo instruction 71, instructions located between a first position shifted from the current PC by a value of <Offset> of the Echo instruction 71 and a second position shifted from the first position by a value of <Length>, that is, the instruction set 61b is copied in the temporary buffer 99. After that, the microprocessor 11 sequentially executes the instructions stacked in the temporary buffer 99. An instruction 91 located next to the instruction set 61b is used for allowing the control flow to return to an instruction 73 located next to the Echo instruction 71 in the code memory 90. Then, the microprocessor 11 executes the instruction 73 and instructions located downward from the instruction 73.

In this manner, the third exemplary embodiment of the present invention employs the temporary buffer 99 for temporarily writing and erasing data when executing the instructions in the non-writable code memory 90, so that the third exemplary embodiment of the present invention can achieve advantageous effects similar to those of the first and second exemplary embodiments of the present invention.

Description has been made in relation to the first to third exemplary embodiments of the present invention employing general Echo instructions. Hereinafter, exemplary embodiments employing the Bitmask Echo instruction will be described. The general Echo instruction is applicable when a predetermined number of instruction sets are completely identical to each other. However, in practice, it may happen that only some instructions are iteratively located. The Bitmask Echo instruction has been suggested in order to compact the code using the microprocessor when there are instruction sets having partially iterative instructions.

Figure 7:
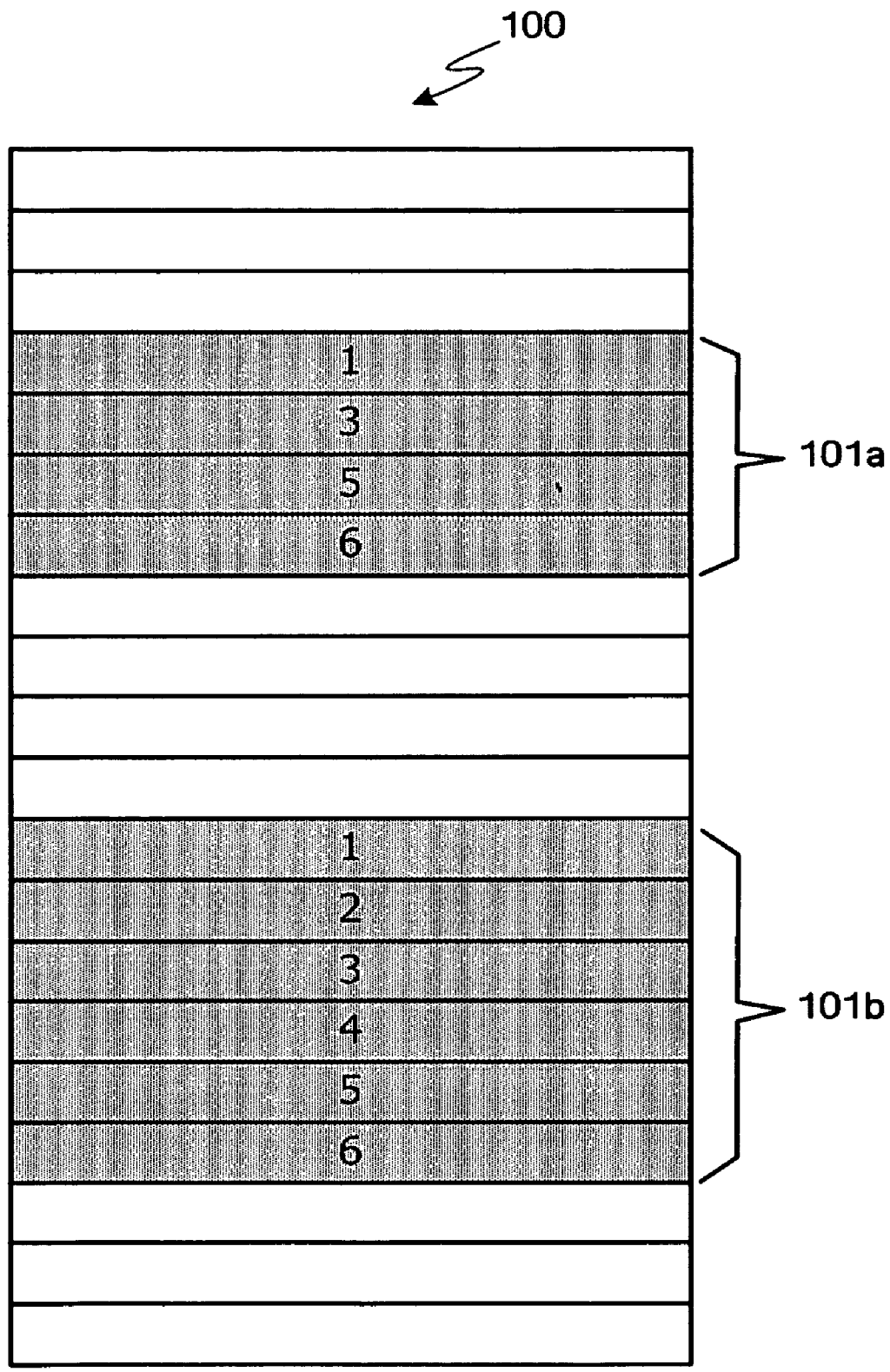
FIG. 7 is a view showing a structure of a code memory having some iterative sections.

If a code memory 100 has a structure as shown in FIG. 7, instruction sets 101a and 101b, which are partially iterative with each other, are involved in the code memory 100. That is, although the instruction sets 101a and 101b commonly have instructions 1, 3, 5 and 6, instructions 2 and 4 are exclusively provided in the instruction set 101b.

Exemplary Embodiment 4

Figure 8:
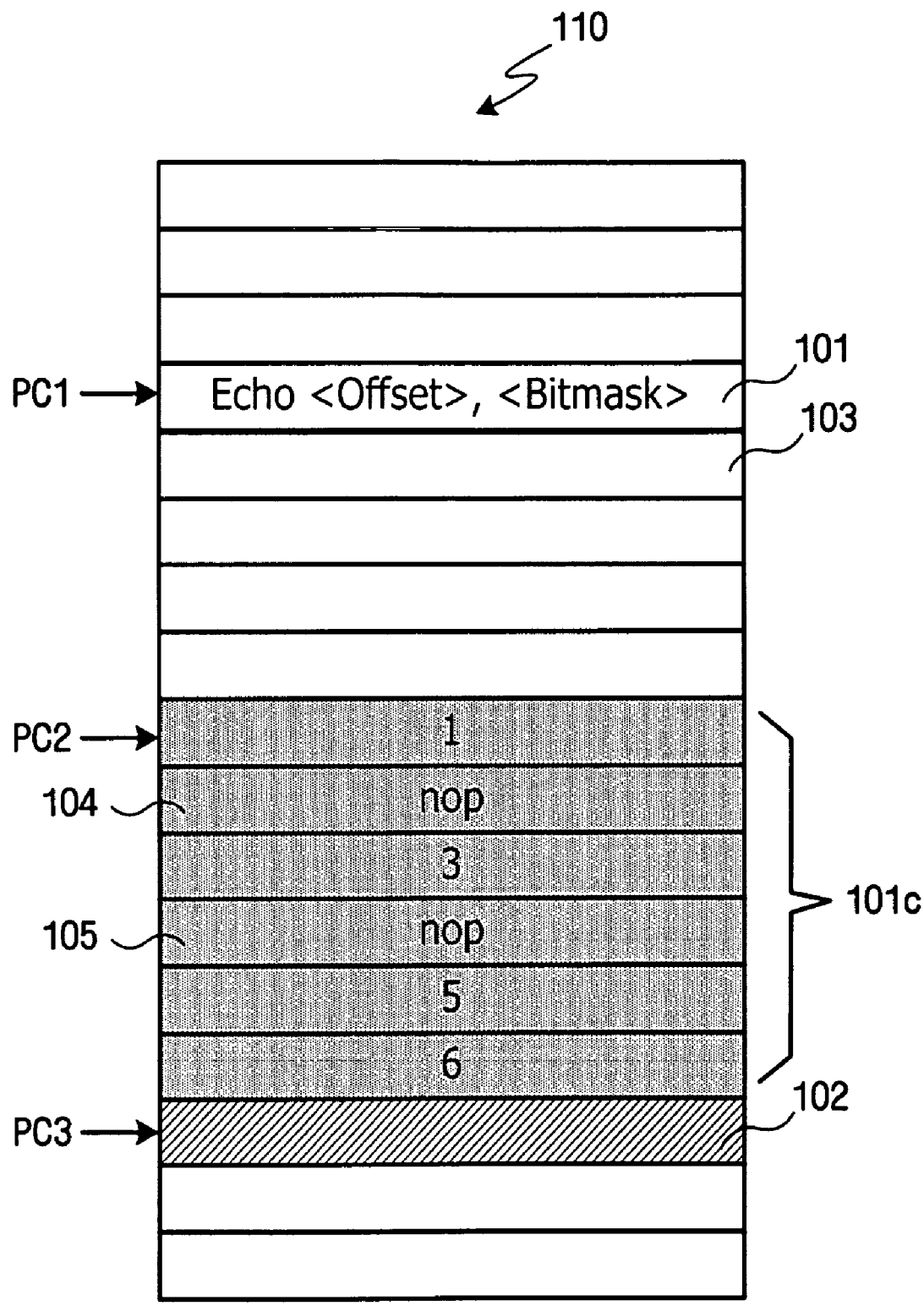
FIG. 8 is a view showing a structure of a code memory according to a fourth exemplary embodiment of the present invention.

The fourth exemplary embodiment of the present invention corresponds to the first exemplary embodiment of the present invention and a structure of a code memory 110 according to the fourth exemplary embodiment of the present invention is shown in FIG. 8. Different from the first exemplary embodiment of the present invention, the fourth exemplary embodiment of the present invention uses a Bitmask Echo instruction 101 including an Operand <Bitmask> instead of <Length>.

When the microprocessor 11 executes the Bitmask Echo instruction 101, an error may occur caused by the undefined instruction, so that an exception handling process must be performed. At this time, a current program count of the code memory 110 is PC1.

If the microprocessor 11 sends information about the instruction 101 causing the error to the operating system 21, the operating system 21 confirms that the Opcode of the instruction 101 is "Echo", so the operating system 21 performs the exception handling process according to the present invention.

At this time, the operating system 21 reads the current program count (PC1) of the instruction 101 and stores it in a predetermined first buffer. In addition, the operating system 21 can determine that there is an iterative instruction set 101c at a position (PC2) shifted from the PC1 by a value of <Offset>.

The operating system 21 can find iterative instructions from the instruction set 101c by reading <Bitmask>. In the case of FIG. 8, for example, <Bitmask> can be represented with a binary number "110101". Here, the size of <Bitmask> corresponds to the cipher of the binary number, that is, the size of <Bitmask> is 6. In addition, "1" represents that there is an iterative instruction and "0" represents that there is no iterative instruction. Although the above binary number is arranged in the reverse order, in which the least significant bit represents the execution of the first instruction, it is also possible to arrange the binary number in the forward order. If the operating system 21 reads the <Bitmask> in the reverse direction, the operating system 21 can find that the second and fourth instructions are non-iterative instructions.

Accordingly, the operating system 21 stores the second and fourth instructions in a predetermined second buffer, and replaces the instructions 104 and 105 with an instruction "nop", which refers to no operation. After that, similar to the first exemplary embodiment of the present invention, the operating system 21 replaces an instruction located next to the instruction set 101b with a predetermined instruction 102, which is not recognized by the microprocessor 11. In addition, the operating system 21 stores the instruction, which is originally located next to the instruction set 61b, in a predetermined third buffer.

Then, the operating system 21 increases the PC of the code memory 110 by the size of the Bitmask from the PC1 (that is, PC2=PC1+Bitmask size×1 unit) and hands over the instruction execution authority to the microprocessor 11 in response to the return command.

Then, if the microprocessor 11 confirms that the current program count is PC2, the microprocessor 11 sequentially executes the instructions from the first instruction of the instruction set 101c. If the microprocessor 11 meets the "nop" instruction 104 or 105, the microprocessor 11 simply executes an instruction located next to the "nop" instruction 104 or 105. However, when the microprocessor 11 executes the instruction 102 after executing the instruction set 101c, the error may occur again.

In this case, the operating system 21 receives the instruction 102 from the microprocessor 11 in order to perform the exception handling. At this time, the current program count of the code memory 70 is PC3. Upon receiving the instruction 102 from the microprocessor 11, the operating system 21 replaces the "nop" instructions 104 and 105 with the instructions corresponding to the digit "0" in the Bitmask, that is replaces the "nop" instructions 104 and 105 with the instructions stored in the second buffer. Thus, the second and third instructions of the instruction set 101c are restored. Also, the operating system 21 replaces the instruction 102 causing the error with the original instruction stored in the third buffer.

In addition, the operating system 21 changes the current PC of the code memory 110 to the PC, which is achieved by adding 1 unit to the PC1 stored in the first buffer. Then, the operating system 21 hands over the instruction execution authority to the microprocessor 11 in response to the return command.

If the microprocessor 11 confirms that the current program count is (PC1+1 unit), the microprocessor 11 executes the corresponding instruction 103 and other instructions located downward from the instruction 103. As a result, the number of the instructions included in the code memory 110 can be reduced even though the execution procedure for the instructions is not changed from the execution procedure shown in FIG. 7.

Exemplary Embodiment 5

Figure 9:
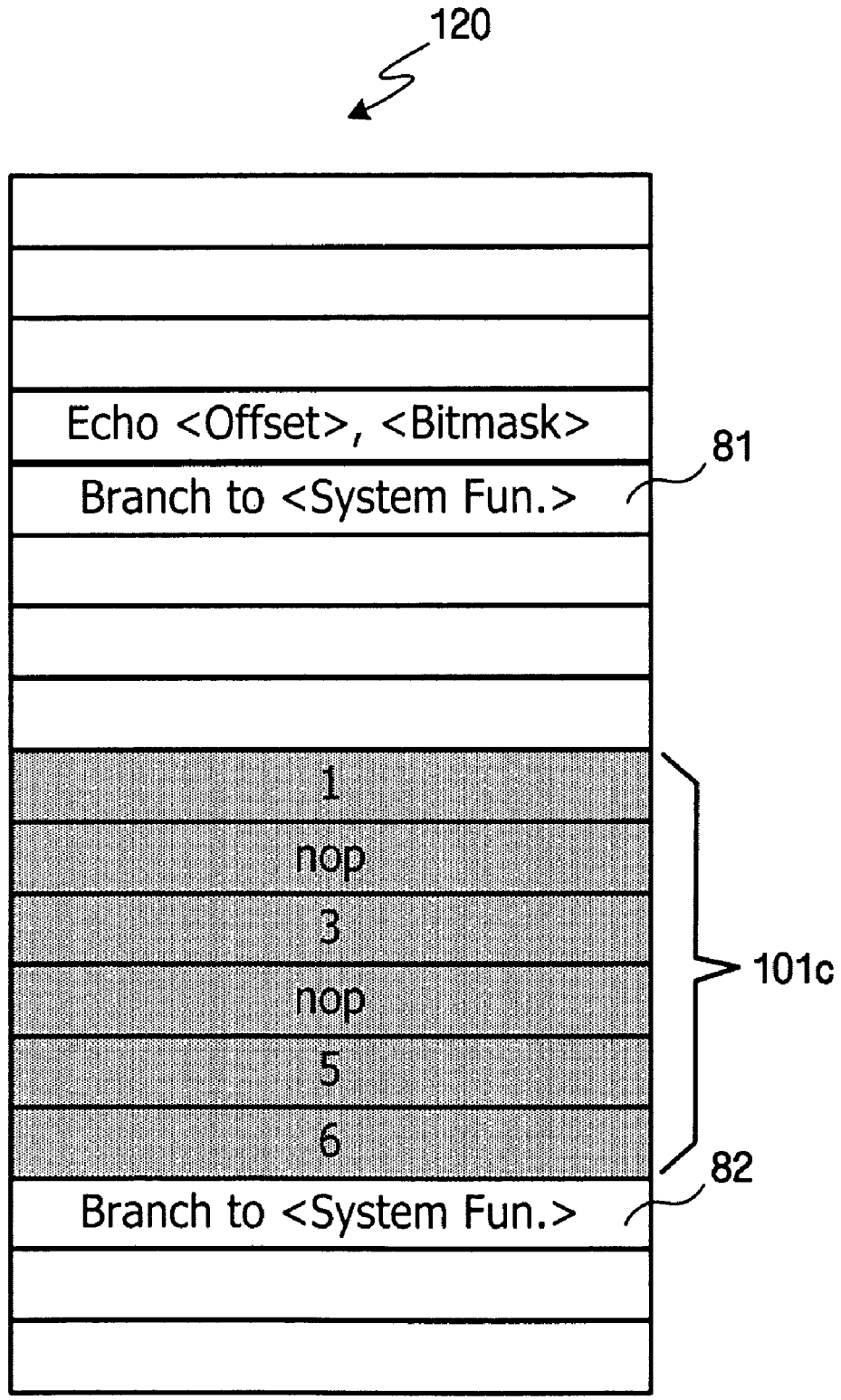
FIG. 9 is a view showing a structure of a code memory according to a fifth exemplary embodiment of the present invention.

The fifth exemplary embodiment of the present invention corresponds to the second exemplary embodiment of the present invention and a structure of a code memory 120 according to the fifth exemplary embodiment of the present invention is shown in FIG. 9. The fifth exemplary embodiment of the present invention is substantially similar to the fourth exemplary embodiment of the present invention, so it will not be further described below in order to avoid redundancy. However, it should be noted that the fifth exemplary embodiment of the present invention is different from the fourth exemplary embodiment of the present invention in that the control of the microprocessor 11 branches to the system function from the instruction of the code memory 110 by system branch instructions (Branch to) 81 and 82, instead of performing the exception handling using the operating system 21.

Exemplary Embodiment 6

Figure 10:
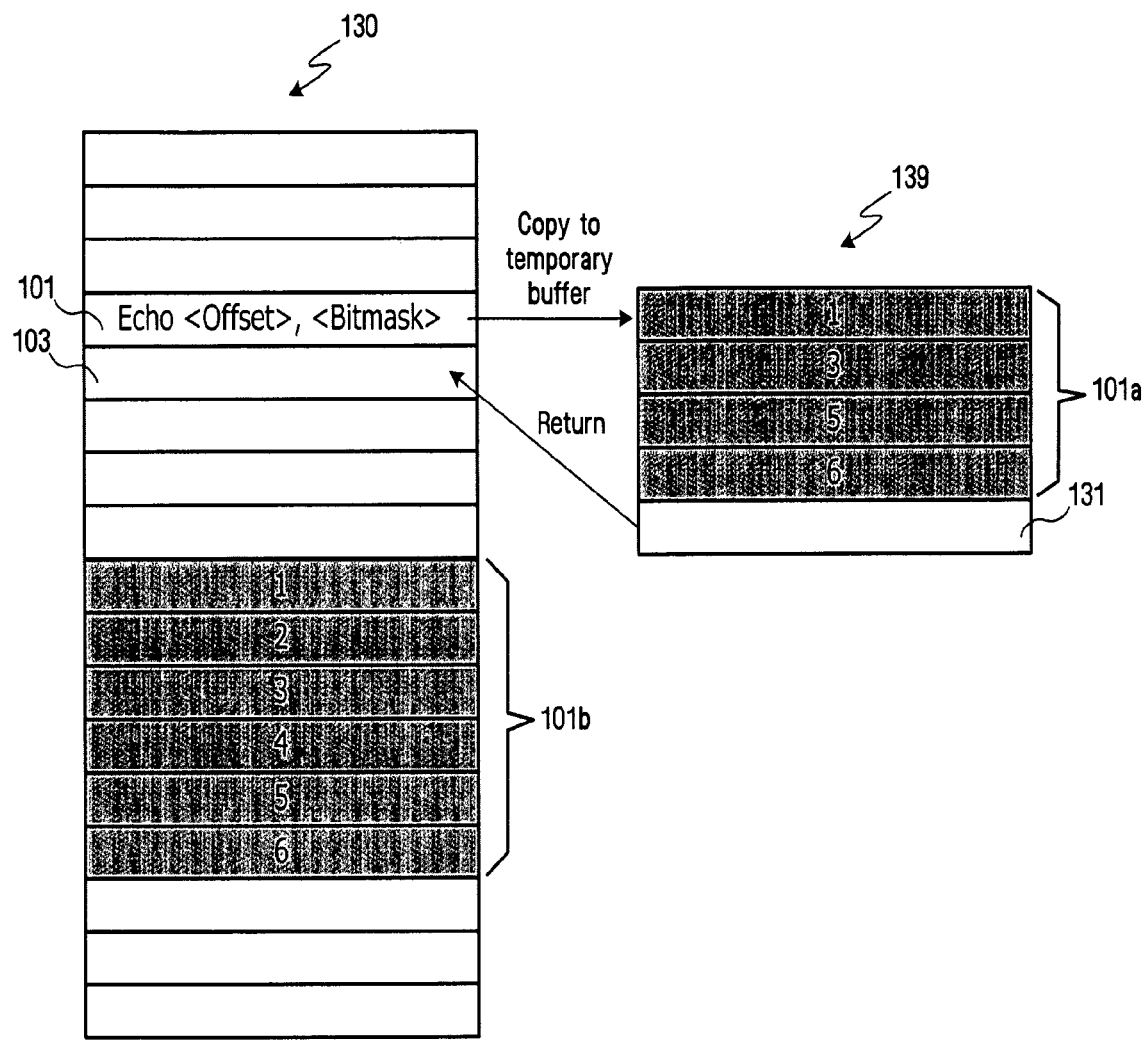
FIG. 10 is a view showing a structure of a code memory according to a sixth exemplary embodiment of the present invention.

The sixth exemplary embodiment of the present invention corresponds to the third exemplary embodiment of the present invention and a structure of a code memory 130 according to the sixth exemplary embodiment of the present invention is shown in FIG. 10. According to the sixth exemplary embodiment of the present invention, the instructions to be executed are stored in a temporary buffer 139 provided in the code memory 13 and then the instructions are executed after changing the addresses of the instructions corresponding to the positions of the instructions in the temporary buffer 139. The sixth exemplary embodiment of the present invention may be efficiently used when the original program includes a memory, such as the ROM 13, which cannot be corrected.

If the microprocessor 11 meets the Echo instruction 101, instructions located downward from a position shifted from the current PC by a value of <Bitmask>, that is, an instruction group 101a is copied in the temporary buffer 139. The instruction group 101a consists of iterative instructions selected from an instruction set 101b based on <Bitmask>. If the <Bitmask> represents "110101", instructions 1, 3, 5 and 6 are iterative instructions and instructions 2 and 4 are non-iterative instructions.

After that, the microprocessor 11 sequentially executes the instructions stacked in the temporary buffer 139. An instruction 131 located next to the instruction set 101b is used for allowing the control flow to return to an instruction located next to the Echo instruction 101, which is lastly executed in the code memory 130. Then, the microprocessor 11 executes the instruction 103 and instructions located downward from the instruction 103.

In this manner, the sixth exemplary embodiment of the present invention employs the temporary buffer 139 for temporarily writing and erasing data when executing the instructions in the non-writable code memory 130, so that the sixth exemplary embodiment of the present invention can achieve advantageous effects similar to those of the fourth and fifth exemplary embodiments of the present invention.

Although the present invention can effectively reduce the size of the program, the execution speed of the program may be lowered by several cycles whenever using the program. However, such a problem can be solved through profiling used in the complier optimization scheme. In detail, after classifying program codes into frequently executed codes and rarely executed codes, if the present invention is exclusively applied to the rarely executed codes, the size of the program can be significantly reduced without degrading the execution speed of the program.

According to the present invention, the size of the program executed in the code memory can be significantly reduced, so that memory having various specifications can be used in the computer system.

In addition, the present invention can reduce the amount of used memory, thereby reducing the power consumption.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method of reducing the size of a program in a code memory, comprising:
    (a) storing a first program count of a first instruction in a first buffer when an error occurs while the first instruction having an opcode, offset operand and length operand is being executed among a plurality of instructions loaded in the code memory;
    (b) changing a current program count of the code memory to a second program count which is obtained by adding the offset operand to the first program count;
    (c) storing a second instruction, which is located at a position a value of the length operand from the second program count in the code memory, in a second buffer;
    (d) replacing the second instruction in the code memory with a third instruction, which is not recognized by a microprocessor as an instruction in the microprocessor instruction set;
    (e) sequentially executing instructions beginning with an instruction corresponding to the second program count;
    (f) replacing the third instruction in the code memory with the second instruction stored in the second buffer when an error occurs while the third instruction is being executed; and
    (g) changing a current program count of the code memory to a program count of the code memory, which is obtained by adding one unit to the first program count stored in the first buffer.

2. The method of claim 1, wherein the first instruction is an echo instruction having the opcode, offset operand, and length operand.

3. The method of claim 1, wherein the program count of the code memory, which is obtained by adding one unit to the first program count stored in the first buffer, is larger in value than the first program count by four.

4. The method of claim 1, wherein (a), (b), (c), (d), (f), and (g) are performed by an operating system and (e) is performed by the microprocessor.

5. The method of claim 4, further comprising handing over an instruction execution authority from the operating system to the microprocessor in response to a return command, between (d) and (e).

6. A method of reducing a size of a program in a code memory, comprising:
    (a) executing a first instruction having an opcode, offset operand, and length operand and a second instruction ordering a branch to a system function, among a plurality of instructions loaded in the code memory;
    (b) storing a first program count of the second instruction in a first buffer;
    (c) changing a current program count of the code memory to a second program count which is obtained by adding the offset operand to the first program count;
    (d) storing a third instruction, which is located at a position a value of the length operand from the second program count in the code memory, in a second buffer;
    (e) sequentially executing instructions beginning with an instruction corresponding to the second program count;
    (f) replacing the third instruction in the code memory with a fourth instruction ordering a branch to the system function;
    (g) replacing the fourth instruction in the code memory with the third instruction stored in the second buffer after the fourth instruction has been executed; and
    (h) changing a current program count of the code memory to a program count of the code memory, which is obtained by adding one unit to the first program count stored in the first buffer.

7. The method of claim 6, wherein (b), (c), (d), (f), (g), and (h) are performed by the system function and (e) is performed by a microprocessor.

8. The method of claim 6, wherein the first instruction is an echo instruction having the opcode, offset operand, and length operand.

9. A method of reducing a size of a program in a code memory, comprising:
    (a) copying instructions, which are located between a first position indicated by an offset and a second position which is a value of length from the first position in code memory, in a temporary buffer when an error occurs while a first instruction having an opcode, offset operand indicating the offset, and length operand indicating the value of length is being executed among a plurality of instructions loaded in the code memory;
    (b) inserting a second instruction, which orders a return to an instruction immediately following the first instruction in the code memory, into a location in the temporary buffer immediately following the instructions copied in the temporary buffer;
    (c) executing the instructions copied in the temporary buffer; and
    (d) returning to the instruction in the code memory immediately following the first instruction loaded in the code memory according to execution of the second instruction.

10. The method of claim 9, wherein the code memory comprises instruction sets, which have been previously recorded in a read only memory (ROM).

11. The method of claim 10, wherein the temporary buffer includes a non-volatile memory.

12. The method of claim 9, wherein the first instruction is an echo instruction having the opcode, the offset operand, and the length operand.

13. A method of reducing a size of a program in a code memory, comprising:
    (a) storing a first program count of a first instruction in a first buffer when an error occurs while the first instruction having an opcode, offset operand, and bitmask operand is being executed among a plurality of instructions loaded in the code memory;
    (b) changing a current program count of the code memory to a second program count which is obtained by adding the offset operand to the first program count;
    (c) storing an instruction, which is represented as a non-iterative instruction by the bitmask operand, in a second buffer and replacing the non-iterative instruction with a "no operation" instruction in the code memory;
    (d) storing a second instruction, which is located at a position a size of the bitmask operand from the second program count in the code memory, in the second buffer and replacing the second instruction in the code memory with a third instruction, which is not recognized by a microprocessor as an instruction in the microprocessor instruction set;
    (e) replacing the "no operation" instruction in the code memory with the instruction stored in the second buffer when an error occurs while the third instruction is being executed and replacing the third instruction in the code memory with the second instruction; and (f) changing a current program count of the code memory to a program count of the code memory, which is obtained by adding one unit to the first program count stored in the first buffer.

14. The method of claim 13, wherein the bitmask operand consists of a string of 1 bit digits representing the value of the bitmask operand.

15. The method of claim 14, wherein each 1 bit digit of the string represents whether an instruction is an iterative instruction in a reverse order.

16. The method of claim 13, wherein the first instruction is a bitmask echo instruction having the opcode, the offset operand, and the bitmask operand.

17. The method of claim 13, wherein (a) to (f) are performed by an operating system.

18. A method of reducing a size of a program in a code memory, comprising:

(a) executing a first instruction having an opcode, offset operand, and bitmask operand, and a second instruction ordering a branch to a system function, among a plurality of instructions loaded in the code memory;

(b) storing a first program count of the second instruction in a first buffer;

(c) changing a current program count of the code memory to a second program count which is obtained by adding the offset operand to the first program count;

(d) storing an instruction, which is represented as a non-iterative instruction by the bitmask operand, in a second buffer, and replacing the non-iterative instruction in the code memory with a "no operation" instruction;

(e) storing a third instruction, which is located at a position a size of the bitmask operand from the second program count in the code memory, in a second buffer and replacing the third instruction in the code memory with a fourth instruction ordering a branch to the system function;

(f) replacing the "no operation" instruction in the code memory with the instruction stored in the second buffer after the fourth instruction is executed and replacing the fourth instruction in the code memory with the third instruction; and (g) changing a current program count of the code memory to a program count of the code memory, which is obtained by adding one unit to the first program count stored in the first buffer.

19. The method of claim 18, wherein the bitmask operand consists of string of 1 bit digits representing the value of the bitmask operand.

20. The method of claim 18, wherein the first instruction is a bitmask echo instruction having the opcode, offset operand, and bitmask operand.

21. The method of claim 18, wherein (b) to (g) are performed by the system function.

22. A method of reducing a size of a program in a code memory, comprising:

(a) copying instructions, which are represented as iterative instructions by a bitmask and are located using an offset, in a temporary buffer when an error occurs while a first instruction, having an opcode, offset operand indicating the offset, and bitmask operand indicating the bitmask, is being executed among a plurality of instructions loaded in the code memory;

(b) inserting a second instruction, which orders a return to an instruction immediately following the first instruction in the code memory, into a location immediately following the instructions copied in the temporary buffer;

(c) executing the instructions copied in the temporary buffer; and (d) returning to the instruction of the code memory, which immediately follows the first instruction loaded in the code memory according to execution of the second instruction.

23. The method of claim 22, wherein the bitmask operand consists of a string of 1 bit digits.

24. The method of claim 22, wherein the code memory includes instruction sets, which have been previously recorded in a read only memory (ROM).

25. The method of claim 22, wherein the temporary buffer includes a non-volatile memory.

26. The method of claim 22, wherein the first instruction is a bitmask echo instruction having the opcode, offset operand, and bitmask operand.

* * * * *